(12) United States Patent
Praharaj et al.

(10) Patent No.: US 11,243,121 B2
(45) Date of Patent: Feb. 8, 2022

(54) INDICATOR TAGS THAT EXHIBIT COLOR TRANSITION

(71) Applicant: Xerox Corporation, Norwalk, CT (US)

(72) Inventors: Seemit Praharaj, Webster, NY (US);
Michael J. Levy, Webster, NY (US);
Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 474 days.

(21) Appl. No.: 16/228,340

(22) Filed: Dec. 20, 2018

(65) Prior Publication Data

US 2020/0200611 A1     Jun. 25, 2020

(51) Int. Cl.

| | |
|---|---|
| *B32B 27/20* | (2006.01) |
| *G01K 11/12* | (2021.01) |
| *B32B 3/12* | (2006.01) |
| *B32B 27/08* | (2006.01) |
| *G01K 3/00* | (2006.01) |
| *G01L 11/02* | (2006.01) |

(52) U.S. Cl.
CPC .............. *G01K 11/12* (2013.01); *B32B 3/12* (2013.01); *B32B 27/08* (2013.01); *B32B 27/20* (2013.01); *G01K 3/005* (2013.01); *G01L 11/02* (2013.01); *B32B 2307/30* (2013.01)

(58) Field of Classification Search
CPC ..... B32B 2307/30; B32B 27/08; B32B 27/20; B32B 3/12; G01K 11/12; G01K 3/005; G01L 11/02; G09F 2003/0276; G09F 3/0291; G09F 3/0376; G09F 3/18
See application file for complete search history.

(56) References Cited

U.S. PATENT DOCUMENTS

2004/0240324 A1   12/2004   Isbitsky et al.
2005/0005839 A1    1/2005   Moule et al.

FOREIGN PATENT DOCUMENTS

WO        2007050281 A2     5/2007

OTHER PUBLICATIONS

Office Action for CA 3,065,200, dated Feb. 12, 2021, pp. 1-5.
Extended EP Search Report, EP Application No. 19217224.5, dated May 19, 2020, copy consists of 12 pages.

*Primary Examiner* — Lawrence D Ferguson

(57) ABSTRACT

An indicator tag and a method for fabricating the same are disclosed. For example, the indicator tag includes a three-dimensional mesh comprising a plurality of pores, wherein the three-dimensional mesh is printed with a water soluble and ultra-violet (UV) light curable ink, a container enclosing the three-dimensional mesh, a membrane coupled to the three-dimensional mesh, and a dye dispensed on top of the membrane, wherein the three-dimensional mesh interacts with the dye when in contact with the dye to provide an indication.

14 Claims, 4 Drawing Sheets

INDICATOR TAGS THAT EXHIBIT COLOR TRANSITION

The present disclosure relates generally to various indicator tags and, more particularly, to an indicator tag that exhibits color transition and a method for making the same.

BACKGROUND

Various products are produced that have an expiration. For example, foods and drugs can have a time expiration. After a certain period of time, the foods may spoil or the drugs may be ineffective. In other industries, products may have limits on exposure. For example, some electronics may have temperature limits or pressure limits. For example, when the electronics are exposed to certain high temperatures or pressures, the electronics may tend to fail.

Some previous solutions may be to manually write a date to indicate the date of expiration. For electronics, the user may be responsible for preventing exposure to the high temperatures and/or pressure. However, these manual solutions may not be reliable.

In addition, it may not be economically or practically feasible to use previous automated solutions. For example, putting a clock or other type of electronic/battery operated timer on a food item or drug may not make practical or economic sense. Putting electronic sensors on the electronic devices may also add costs to the manufacture and/or production of these electronic devices.

SUMMARY

According to aspects illustrated herein, there are provided an indicator tag and a method for fabricating the same. One disclosed feature of the embodiments is an indicator tag that comprises a three-dimensional mesh comprising a plurality of pores, wherein the three-dimensional mesh is printed with a water soluble and ultra-violet (UV) light curable ink, a container enclosing the three-dimensional mesh, a membrane coupled to the three-dimensional mesh, and a dye dispensed on top of the membrane, wherein the three-dimensional mesh interacts with the dye when in contact with the dye to provide an indication.

Another disclosed feature of the embodiments is a method for fabricating an indicator tag. In one embodiment, the method comprises printing, by a printing device, a three-dimensional mesh with a water soluble and ultra-violet (UV) light curable ink, wherein the three-dimensional mesh is printed with a plurality of pores, enclosing the three-dimensional mesh with a container, applying a membrane on top of the three-dimensional mesh, and dispensing a dye on top of the membrane, wherein the three-dimensional mesh interacts with the dye when in contact with the dye to provide an indication.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses indicator tags that exhibit color transition and methods for making the same. As discussed above, various products may have an expiration or may have a possibility of failure when exposed to certain temperatures or pressure. As noted above, trying to rely on manual solutions or expensive electronic solutions to indicate the expiration or exposure to certain temperatures and pressure may not be feasible.

The present disclosure provides a low cost printable indicator tag that can exhibit a color transition to provide different indications. The indicator tag can be printed using a three dimensional printer. The indicator tag can be manufactured to indicate various amounts of time, temperature, and/or pressure.

Figure 1:
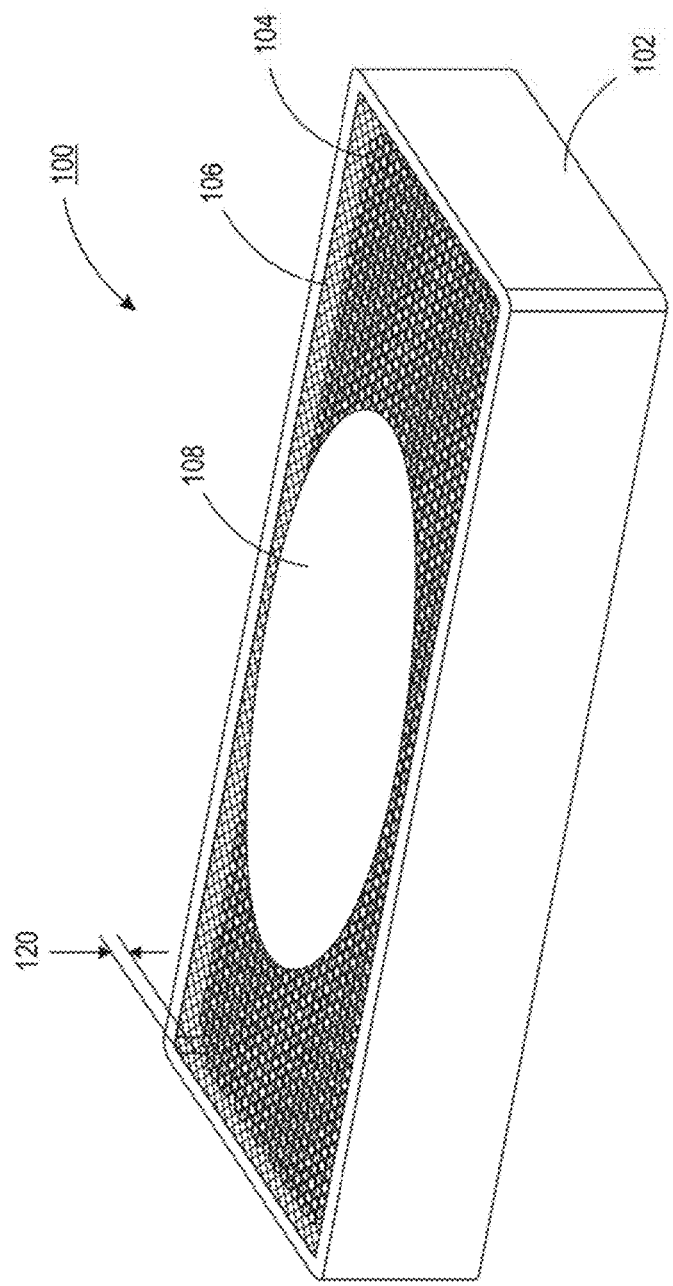
FIG. 1 illustrates an isometric view of an example indicator tag of the present disclosure.

FIG. 1 illustrates an isometric view of an example indicator tag 100 of the present disclosure. In one embodiment, the indicator tag 100 includes a container 102, a mesh 104, a membrane 106, and a dye 108. The container 102 may enclose the mesh 104.

In one embodiment, the mesh 104 may be a three-dimensional (3D) mesh. The mesh 104 may be printed via a printing device. For example, the mesh 104 may be printed with a water soluble and ultra-violet (UV) light curable ink. The printing device may have printheads that dispense the water soluble UV curable ink onto a platform or surface. The ink may be cured under UV lights.

In one embodiment, the ink when cured may have a firm structure. In other words, the UV cured ink may have a rigid texture. The water soluble UV curable ink may be used to print raised images on various different surfaces. However, the water soluble UV curable ink may be printed in additional layers to build the mesh 104.

In one embodiment, the membrane 106 may be applied to the top of the mesh 104. In one embodiment, the membrane 106 may be applied to the outer perimeter of the container 102 to create a gap between the membrane 106 and the mesh. The gap may allow the membrane 106 to be punctured in some instances. The membrane 106 may be fabricated from a variety of different materials to provide different indications, as discussed in further details below.

In one embodiment, the indicator tag 100 may also include a dye 108 that is dispensed on top of the membrane 106. In one embodiment, the dye 108 may be enclosed on top of the membrane 106. For example, another membrane or layer may be applied to contain the dye 108. The dye 108 may be a water based ink that may be used to interact with the mesh 104.

In one embodiment, when the dye 108 contacts the mesh 104, the dye 108 may dissolve the mesh 104. For example, the membrane 106 may be removed, may be dissolved due to an indication, may open due to an indication, may be punctured, and the like.

In one embodiment, the mesh 104 may be designed to provide any desired indication of an expiration of time. Based on how the mesh 104 is designed and fabricated, the indication of the expiration of time may be provided when the dye 108 completely dissolves the mesh 104. In one embodiment, the amount of dye 108 that is dispensed may be based on the desired indication and sufficient to dissolve the mesh 104 within the indication.

In one embodiment, the color of the dye 108 and the color of the water soluble UV curable ink that is used to print the mesh 104 may be complementary colors. For instance, the dye 108 may be yellow and the mesh 104 may be green. As a result, when the dye 108 completely dissolves the mesh 104, the remaining liquid may be a blue liquid.

A user may know that the indication is present when the remaining liquid is completely blue. For example, if the indication was an expiration of time (e.g., 3 months), the user may know that the expiration of time has not been reached until the mesh 104 is completely dissolved and the liquid that remains is blue.

In one embodiment, the container 102 may have a lip 120. The lip 120 may ensure that the dye 108 does not overflow and spill out of the container 102. The container 102 may have a length and width that is approximately the same as the mesh 104. In one embodiment, the container 102 may be printed with the water soluble UV curable ink. In other words, the container 102 and the mesh 104 may be a single unitary printed part.

Figure 2:
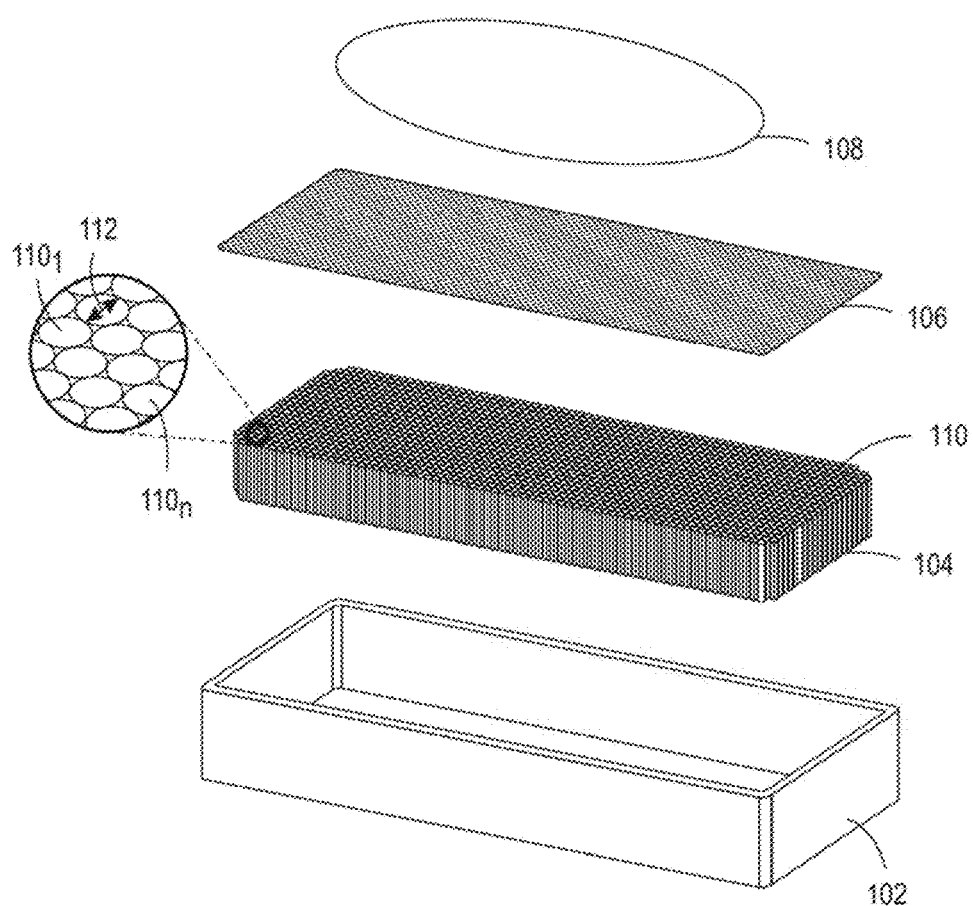
FIG. 2 illustrates an exploded isometric view of the example indicator tag of the present disclosure.

FIG. 2 illustrates an exploded isometric view of the example indicator tag 100. FIG. 2 illustrates the container 102, the mesh 104, the membrane 106, and the dye 108. Although FIG. 2 illustrates the container 102 and the mesh 104 as separate components, it should be noted that the container 102 and the mesh 104 may be printed as a single unitary piece, as noted above.

In one embodiment, the mesh 104 may include pores $110_1$ to $110_n$ (hereinafter also referred to individually as a pore 110 or collectively as pores 110). As noted above, the mesh 104 may be printed to provide a desired indication. For example, the pores 110 may have a diameter 112 or opening size. In one embodiment, the diameter 112 of the pores 110 may be varied to achieve a desired indication. The larger the pores 110, the more quickly the dye 108 may enter the mesh 104 and dissolve the mesh 104. In some applications, it may be desired to have an instantaneous indication. Thus, the diameter 112 of the pores 110 may be made large to allow the dye 108 to almost instantly dissolve the mesh 104 upon contact.

In another embodiment, it may be desired to have a slower indication. Thus, the diameter 112 of the pores 110 may be made smaller to prevent the dye 108 from entering the mesh 104 too quickly. Thus, the dye 108 may slowly dissolve the mesh 104. In one example, the indication may be an expiration of time as noted above. As a result, the diameter 112 of the pores 110 may be made to allow the dye 108 to fully dissolve the mesh 104 in the desired amount of time.

In one embodiment, the mesh 104 may be printed to have a lattice-like structure with a finite pore size. The lattice-like structure of the mesh 104 may have a controlled dissolution in the presence of the dye 108. In one example, the interaction of the mesh 104 and the dye 108 may follow a two-dimensional hyperbolic decay function, such as $y=a(1-e^{-bt})$, where a and b are constants, e is an exponential function, and t is time. The decay function may be bound by a maximum value of a, which may be user selected. The value of b may represent a pore size in the mesh 104. The smaller the value of b, the more time it takes for the decay function to reach equilibrium (e.g., the complete dissolution of the mesh 104 in the dye 108).

The indicator tag 100 may be designed to provide a variety of different indications. For example, the indications may include an expiration of time as noted above, an exposure to a temperature, an exposure to a temperature for a predefined amount of time, a pressure, or the like. In the example of the expiration of time, the mesh 104 may be designed to dissolve in three months to indicate an expiration of a medicine. The cap of a prescription bottle may include the indicator tag 100. When the user opens the cap, the user may puncture the membrane 106 to allow the dye 108 to contact the mesh 104. After three months the mesh 104 may be completely dissolved by the dye 108.

In another example for expiration of time, the indicator tag 100 may be used for day passes to an amusement park. For example, the mesh 104 may be designed to dissolve after 24 hours. As a result, when a patron enters the park, the membrane 106 may be punctured or removed to allow the dye 108 to contact the mesh 104. The mesh 104 may dissolve after 24 hours. Thus, if the patron tries to use the pass again, an employee may easily see that the mesh 104 has been completely dissolved by the dye.

In one embodiment, the remaining liquid may be of a complementary color to the dye 108 and the mesh 104. For example, the dye 108 may be yellow and the mesh 104 may be green. When the mesh 104 is completely dissolved, the remaining liquid may turn blue.

In the example of temperature, the membrane 106 may be made to burst or dissolve at a predefined temperature. For example, the membrane 106 may be a material that burns or melts at 100 degrees Celsius (° C.). The mesh 104 may be designed to dissolve instantly when contacted with the dye 108. As a result, a user may see that the indicator tag 100 has been exposed to a temperature of 100° C. or greater.

For example, a manufacturer may void a warranty for an electronic device if the device has been exposed to temperatures of 100° C. or greater. A user may leave his or her laptop in her car in the summer when the temperature inside the car may be greater than 100° C. The laptop may fail and the user may want to return the laptop. However, the manufacture may check the indicator tag 100 to see that the mesh 104 has melted indicating that the indicator tag 100 (and the laptop) have been exposed to temperatures greater than 100° C. and deny the return.

In the example of temperature and time, the membrane 106 may be made from a material that can slowly melt or dissolve over a period of time. For example, the membrane 106 may be a paraffin wax that melts when exposed to temperatures greater than a predefined temperature for a predefined period of time (e.g., 150° C. for 30 minutes).

For example, a manufacturer may void a warranty for an electronic device if the device has been exposed to a certain temperature for longer than a predefined amount of time. For example, it may be known that exposing a camera to temperatures of greater than 150° C. for longer than 2 hours may damage the camera. Thus, if the user tries to claim a manufacturing defect on the camera, the manufacturer may check the indicator tag 100 to see that the mesh 104 is completely dissolved by the dye 108. Thus, the manufacturer may know that the camera has been exposed to temperatures greater than 150° C. for longer than 2 hours.

In an example of pressure, the membrane 106 may be made from a material that bursts at a predefined pressure. For example, a gas may be injected between the membrane 106 and the mesh 104. The gas may expand under a predefined pressure. When the indicator tag 100 is exposed to the predefined pressure, the gas may expand causing the membrane 106 to burst and allow the dye 108 to fall into the mesh 104.

In another embodiment, the membrane 106 may be made from a porous material. The pores may remain closed when exposed to a pressure below a predefined pressure. However, when the pressure exceeds the predefined pressure, the pores may open allowing the dye 108 to fall into the mesh 104.

For example, a watch manufacturer may warranty a watch for use only up to 10 meters underwater. If the watch goes deeper than 10 meters, the pressure may cause the watch to malfunction. A user may go diving with a watch hundreds of meters deep. The pressure may cause the membrane 106 to burst or the pores to open allowing the dye 108 to contact the mesh 104. As a result, the mesh 104 may be completely dissolved by the dye 108. The watch manufacturer may see this and void a warranty on the watch since the indicator tag 100 indicates that the watch has been exposed to pressures greater than the pressure at a depth of the recommended 10 meters.

Figure 3:
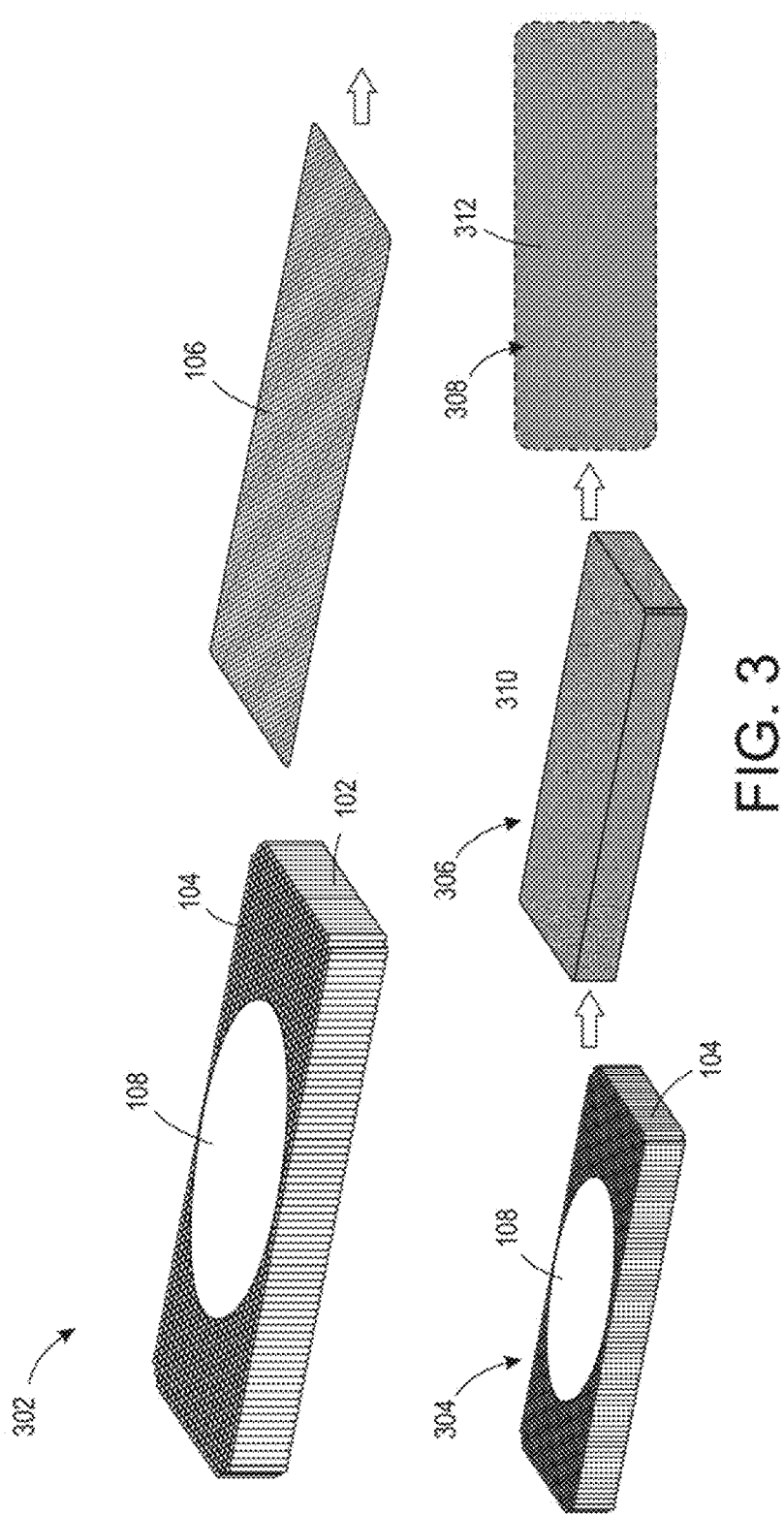
FIG. 3 illustrates an operational flow diagram of activating the indicator tag of the present disclosure.

FIG. 3 illustrates an example operational flow diagram of activating the indicator tag 100. At block 302, the membrane 106 may be removed. As noted above, the membrane 106 may be removed in several different ways depending on the indication that is provided by the indicator tag 100. For example, the membrane 106 may be peeled away from the container 102, the membrane 106 may be punctured, the membrane 106 may be melted, the membrane 106 may burst, the membrane 106 may have pores that open and close, and the like.

At block 304, the dye 108 may contact mesh 104. The dye 108 may begin entering the pores 110 of the mesh 104 to dissolve the mesh 104.

At block 306, the dye 108 and the dissolved portions of the mesh 104 may begin to mix to form an intermediary mixture 310. The intermediary mixture 310 may be a mixture of the dye 108 and the dissolved portions of the mesh 104 and may appear to be more of the color of the dye 108 or the mesh 104. In other words, the intermediary mixture 310 may be formed when the mesh 104 has not completely dissolved to form a complementary color to the dye 108 and the mesh 104.

At block 308, the mesh 104 may be completely dissolved. As a result the dissolved mesh 104 and the dye 108 may mix to form the complementary color mixture 312. As discussed above, the dye 108 and the mesh 104 may be colors that mix together to form a third complementary color. For example, the dye 108 can be red and the mesh 104 can be yellow to form an orange complementary color mixture 312. The dye 108 can be red and the mesh 104 can be blue to form a purple complementary color mixture 312, and so forth.

As discussed above, the speed at which the mesh 104 is dissolved by the dye 108 may be a function of a design of the mesh 104 (e.g., the diameter 112 or opening size of the pores 110). In addition, the design of the mesh 104 may be based on a desired indication. For example, the mesh 104 may be designed to dissolve over a predetermined amount of time to indicate a particular expiration of time or the mesh 104 may be designed to dissolve instantaneously to indicate exposure to a particular temperature or pressure.

Thus, the present disclosure provides a low cost and effective indicator tag 100 that can be used to provide a variety of different indications. For example, the indicator tag 100 can be used to indicate an expiration of time, an exposure to a certain temperature, an exposure to a certain pressure, or any combination thereof. The indicator tag 100 can be produced using existing printers that can dispense and cure water soluble UV curable inks to form the mesh 104.

Figure 4:
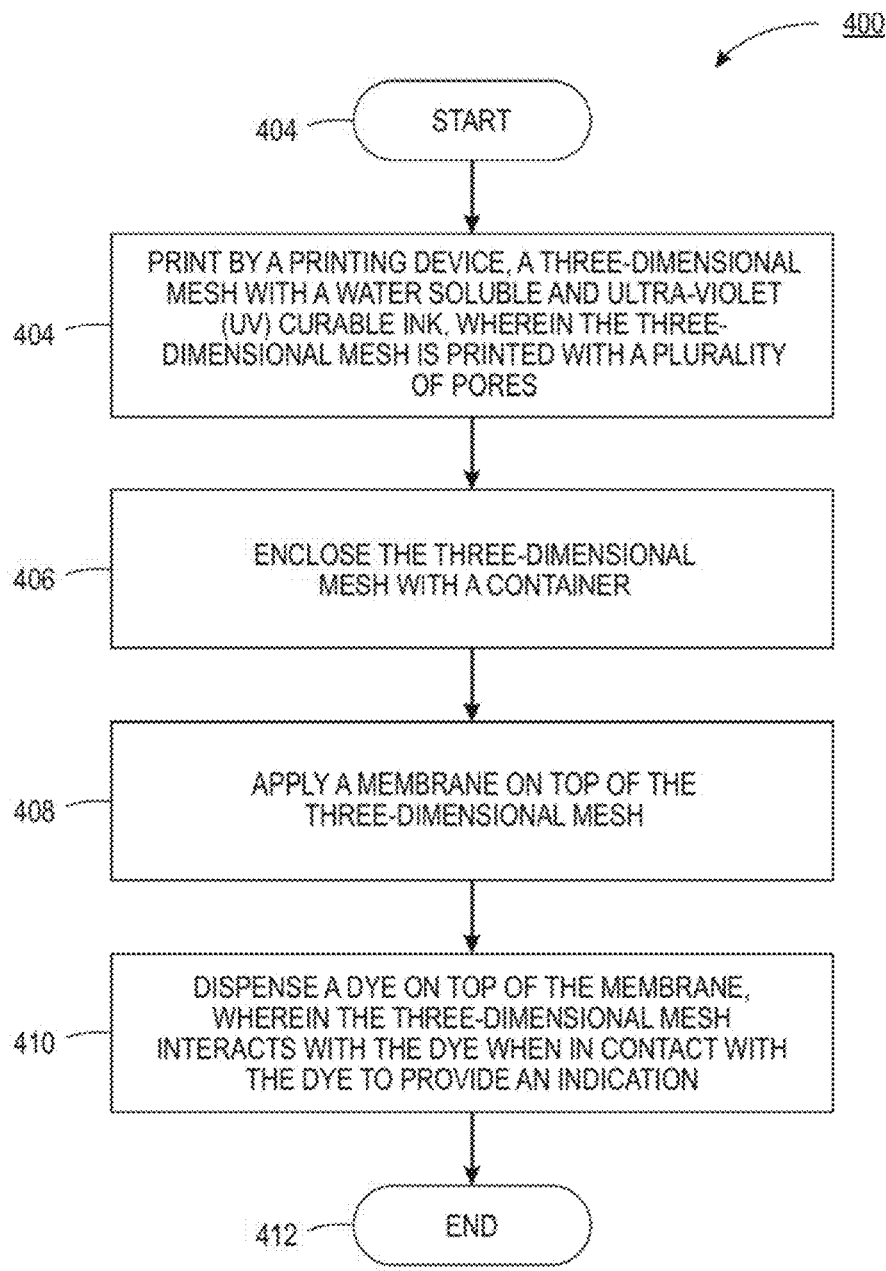
FIG. 4 illustrates a flowchart of an example method for fabricating an indicator tag of the present disclosure.

FIG. 4 illustrates a flowchart of an example method 400 for fabricating an indicator tag of the present disclosure. In one embodiment, one or more steps or operations of the method 400 may be performed by a printer that dispenses or prints water soluble UV curable ink and/or one or more items of manufacturing equipment as part of an assembly line or manufacturing facility.

At block 402, the method 400 begins. At block 404, the method 400 prints, by a printing device, a three-dimensional mesh with a water soluble and ultra-violet (UV) light curable ink, wherein the three-dimensional mesh is printed with a plurality of pores. In one example, an external computing device may be used to design and model the mesh. The 3D model may be transmitted to the printer. The printer may then dispense the water soluble UV curable ink layer by layer. For example, the water soluble UV curable ink may be dispensed on a first layer and then cured. The printer may then dispense the water soluble UV curable ink on a second layer and then cured, and so forth.

The water soluble UV curable ink may be dispensed in accordance with a design of the 3D model of the mesh. The design may include features such as a plurality of pores in the mesh, a size of the pores (e.g., an average diameter), and the like.

At block 406, the method 400 encloses the three-dimensional mesh with a container. For example, the container may be a non-soluble material. For example, the container may be fabricated from a plastic or metal. In another embodiment, the container may also be printed. The container may be printed as part of the mesh. In other words, the container and the mesh may be printed as a single unitary piece.

At block 408, the method 400 applies a membrane on top of the three-dimensional mesh. In one embodiment, the membrane may be applied directly on top of the three-dimensional mesh. In one embodiment, the membrane may be placed over the top of the three-dimensional mesh by applying the membrane around the outer edge of the container.

The membrane may be fabricated from a variety of different materials depending on the indication provided by the indicator tag, as discussed above. The membrane may be any thin piece of plastic that can be punctured, the membrane may be a material that melts (e.g., paraffin wax), the membrane may be a material that bursts, the membrane material may be a porous material that has pores that open under certain pressure, and the like.

At block 410, the method 400 dispenses a dye on top of the membrane, wherein the three-dimensional mesh interacts with the dye when in contact with the dye to provide an indication. As discussed above, the color of the dye and the three-dimensional mesh may be complementary colors to form a third color when mixed. The indication may be an expiration of time, an exposure to a predefined temperature, an exposure to a predefined pressure, and the like. At block 412, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An indicator tag, comprising:
 a three-dimensional mesh comprising a plurality of pores, wherein the three-dimensional mesh is printed with a water soluble and ultra-violet (UV) light curable ink;
 a container enclosing the three-dimensional mesh;
 a membrane coupled to the three-dimensional mesh; and
 a dye dispensed on top of the membrane, wherein the three-dimensional mesh interacts with the dye when in contact with the dye to provide an indication.

2. The indicator tag of claim 1, wherein the membrane is removably coupled to a top side of the three-dimensional mesh, wherein the membrane is removed to expose the three-dimensional mesh to the dye.

3. The indicator tag of claim 1, wherein the membrane is coupled to the top side of the three-dimensional mesh via an adhesive, wherein the membrane is punctured to expose the three-dimensional mesh to the dye.

4. The indicator tag of claim 1, wherein the membrane comprises a non-permeable membrane and the indication comprises an expiration of time.

5. The indicator tag of claim 4, wherein the plurality of pores are sized as a function of time to change color and completely dissolve when in contact with the dye.

6. The indicator tag of claim 1, wherein the membrane comprises a temperature sensitive membrane and the indication comprises a temperature.

7. The indicator tag of claim 6, wherein the plurality of pores have a diameter that causes an instant reaction when contact with the dye when the temperature sensitive membrane is removed by exposure to a temperature above a threshold.

8. The indicator tag of claim 1, wherein the membrane comprises a time and temperature sensitive membrane wherein the indication comprises an expiration of time and a temperature.

9. The indicator tag of claim 8, wherein the membrane comprises a paraffin wax that dissolves after exposure to a predefined amount of time at a predefined temperature.

10. The indicator tag of claim 1, wherein the membrane comprises a material that bursts under a predefined amount of pressure and the indication comprises an amount of pressure.

11. The indicator tag of claim 1, wherein the membrane comprises a porous material, wherein membrane pores of the membrane open to release the dye when exposed to a predefined amount of pressure.

12. The indicator tag of claim 1, wherein a color of water soluble and UV light curable ink is a complementary color of a color of the dye.

13. The indicator tag of claim 12, wherein the three-dimensional mesh completely dissolves to form a liquid of the complementary color when exposed to the dye.

14. An indicator tag, comprising:
 a three-dimensional mesh comprising a plurality of pores, wherein the three-dimensional mesh is printed with a water soluble and ultra-violet (UV) light curable ink, wherein an average diameter of the plurality of pores is a function of a desired rate of an indication;
 a container enclosing the three-dimensional mesh, wherein a height of the container is higher than a height of the three-dimensional mesh;
 a membrane coupled to the container over the three-dimensional mesh; and
 a dye dispensed on top of the membrane and inside of the container, wherein the three-dimensional mesh interacts with the dye when the membrane is removed and the dye contacts the three-dimensional mesh to provide an indication, wherein the indication comprises at least one of: an expiration of time based on average diameter of the plurality of pores of the three-dimensional mesh, a temperature based on a membrane that melts at a predefined temperature, or a pressure based on a membrane that comprises membrane pores that open when exposed to a predefined pressure.

* * * * *